Patented May 4, 1954

2,677,616

UNITED STATES PATENT OFFICE 2,677,616

SYNERGISTIC ANTIOXIDANTS CONTAINING ANTIOXIDANT ACIDS

Lloyd A. Hall, Chicago, Ill., assignor to The Griffith Laboratories, Inc., a corporation of Illinois No Drawing. Application June 11, 1952, Serial No. 292,993

14 Claims. (Cl. 99—163)

This invention relates to lecithin citrate and particularly to the use of lecithin citrate as an antioxidant in fatty foods.

This application is a continuation-in-part of my copending application Serial No. 175,015, filed July 20, 1950, which is a continuation-in-part of my application Serial No. 27,835, filed May 18, 1948, now abandoned.

The protection of fats against oxidation has long been a problem. Lard, particularly, requires the presence of an antioxidant to avoid rancidity. These antioxidants must be fat soluble in themselves or made so. The antioxidants now primarily in use are propyl gallate, "BHA" (butylated hydroxyanisole) and "NDGA" (nordihydroguaiaretic acid). In connection with all of these antioxidants, it has been customary to use synergists. Of these, citric acid is the most important because it not only improves the action of the antioxidant, but because it is a metal sequestering agent and thus prevents or inhibits color changes and also by its sequestration is in a position to remove metals which may act as prooxidants. Citric acid, however, is not fat soluble and the problem of obtaining proper distribution of it in the fatty material has not hitherto been overcome.

I have discovered, however, that citric acid may be rendered fat soluble without in any way destroying the value of the citric acid as a synergist or as a metal sequestering material by reacting it under properly water-free conditions with lecithin. When so reacted, it may be introduced to the fat in any suitable manner, either together with or separately from the primary antioxidant.

By the name "lecithin" I include the lecithin group which is commonly known as lecithols and the substituted products thereof which still retain the synergistic property.

In preparing the antioxidant composition, it is preferred that the temperature be sufficiently high to cause substantially complete dissolving of the constituents, but below the decomposition point of the lecithin. The optimum temperature will vary depending on the particular constituents employed.

As an example of making the new compound lecithin citrate, 26 grams of anhydrous citric acid was added uniformly over the entire surface of 150 grams of commercial lecithin (has an acid number of about 30 and contains from 65% to 66% phospholipides and approximately 34% to 35% soya bean oil) which was previously heated to a temperature of about 180° to 185° F. The citric acid was added over a period of approximately 20 minutes and the mixture stirred continuously during this addition and for 45 minutes thereafter, until substantially complete reaction occurred. During this period the temperature was maintained at between 180° and 185° F. An X-ray analysis of the resultant antioxidant product shows that the characteristic diffraction lines for citric acid as such were not present in the X-ray pattern for this composition. Instead, the lines were different and characteristic, thus indicating that lecithin citrate was formed as a new entity or compound.

To prevent separation of the citric acid, it is important that the amount of free water present during the reaction should not exceed about 2%.

Instead of employing anhydrous citric acid in the above described example, U. S. P. crystalline citric acid (the monohydrate $C_6H_8O_7.H_2O$ containing 8.58% $H_2O$ of crystallization) was employed. An X-ray analysis of this resultant antioxidant product also indicated the formation of the new entity or compound lecithin citrate.

As an example of preparing lecithin citrate dissolved in an edible oil, 75 grams of lecithin citrate were added to 100 grams of corn oil previously heated to a temperature of about 180° to 185° F. The lecithin citrate was added over a period of about 10 minutes and the solution was stirred continuously during this addition and for 35 minutes thereafter until the lecithin citrate was completely dissolved. During this period the temperature was maintained at between 180° and 185° F. and the free water content was about 1%. The resultant antioxidant solution did not separate out into distinct liquid layers after standing for a long period of time.

It is preferred to employ the lecithin citrate in a carrier of an edible oil of which the preferred oils are corn oil, wheat germ oil, or any other oil containing tocopherols as the tocopherols also have an antioxidant action. Since soya oil sometimes tends to cause a heavy sludge it is therefore not normally utilized. Cotton seed oil, the various hydrogenated oils, lard oils and mixtures of these or other oils may also be employed. When such a carrier is employed and the resulting solution is to be stored for a relatively long period of time, it is important that the lecithin citrate be dissolved in the edible oil under conditions whereby the amount of free water present is not substantially greater than about 1% to prevent subsequent separation of the citric acid. In addition, the temperature should be sufficiently high to cause substantially complete dissolving of the lecithin citrate in the edible oil, but below the decomposition point of the lecithin, preferably between 180° to 185° F.

The antioxidant composition of lecithin citrate and an edible oil may be prepared either in regular strength or concentrated form with a gallic acid ester. In preparing such composition it is important that the amount of free water present during the preparation should not exceed about 5% in order to prevent subsequent formation of separate liquid layers.

The preferred proportions for both regular and concentrated strengths are as follows:

TABLE I

| | Per cent |
|---|---|
| Gallic acid ester | 1.5 to 7.5 |
| Citric acid | 1.5 to 7.0 |
| Phospholipide present in lecithin | 12.0 to 40.0 |
| Edible oil | 85.0 to 42.5 |

The commercial regular antioxidant is preferably within the following ranges:

TABLE II

| | Per cent |
|---|---|
| Gallic acid ester | 1.5 to 6.0 |
| Citric acid | 1.5 to 3.0 |
| Phospholipide present in lecithin | 12.0 to 25.0 |
| Edible oil | 85.0 to 66.0 |

The commercial concentrated antioxidant is preferably within the following ranges:

TABLE III

| | Per cent |
|---|---|
| Gallic acid ester | 6.0 to 7.5 |
| Citric acid | 3.0 to 7.0 |
| Phospholipide present in lecithin | 25.0 to 40.0 |
| Edible oil | 66.0 to 45.0 |

As will be noted, the upper limits of the preferred commercial regular antioxidants are the same as the lower limits of the commercial concentrated antioxidants. If a particular antioxidant composition falls in this region, it may be classed as either regular or concentrated.

As an example of the commercial regular antioxidant, excellent results have been obtained with a composition consisting of 2.75% propyl gallate, 2.5% citric acid, 14.0% lecithin, and 80.75% corn oil. As to the concentrated antioxidant, excellent results have been obtained with a composition consisting of 6.6% propyl gallate, 6.0% citric acid, 34.0% lecithin and 53.4% corn oil.

In preparing such antioxidant compositions, it is preferred that the edible oil be heated and the phospholipide, citric acid and gallic ester be added in that order with continuous agitation. After all the ingredients have been dissolved in the oil, the composition is cooled as rapidly as possible in order to prevent the formation of a jelly layer and a clear oil layer. In a preferred method of preparing the commercial regular antioxidant, 807.5 lbs. of refined corn oil is introduced into a tank that is equipped with adequate agitation equipment. The oil is warmed to a temperature of 185° F. and 140 lbs. of lecithin is added. The mixture is stirred for ten minutes and then 25 lbs. of anhydrous citric acid is added. This mixture is agitated for one-half hour with the temperature being maintained between 175° to 185° F. At the end of this period, 27.5 lbs. propyl gallate is added and the agitation is continued for one-half hour within the above temperature range. At the end of this time, all of the ingredients have gone into solution in the corn oil. The batch is then immediately cooled as rapidly as possible to a temperature of at least 100° F. This cooling period should not require more than one hour as prolonged heating at higher temperatures causes the batch to break down with the formation of a jelly layer and a clear upper oil layer. When the cooling is done as rapidly as possible, however, this break down is avoided.

It is preferred that the individual ingredients be added as soon as possible and the oil agitated only long enough to dissolve each ingredient. After all ingredients have been added, the solution should be cooled as rapidly as possible. When these and other previously described factors are observed the solution can be maintained in storage for several months without separation.

In a preferred method of making the commercial concentrated composition, 534 lbs. of refined corn oil are introduced into a tank equipped with adequate agitation means. The oil is warmed to a temperature of 185° F. and 340 lbs. of lecithin are added. The mixture is agitated for ten minutes and 60 lbs. of anhydrous citric acid are added. The agitation is continued for about one-half hour with the temperature being maintained between 175° and 185° F. At the end of this period, 66 lbs. of propyl gallate are added and the agitation continued for one and one-half hours while the mixture is maintained within the above temperature range. At the end of this period, the batch is cooled as rapidly as possible to a temperature of at least 100° F. This cooling period should not require more than one hour so as to prevent breakdown of the composition into a jelly layer and a clear upper oil layer.

The antioxidant composition of this invention will produce a synergistic antioxidant effect when used in fatty food materials and will also inhibit discoloration of the food by any metals with which the food comes in contact.

The antioxidant compositions are used in the oil or fat to be stabilized by mixing them into the same at 140° F. to 240° F. in any amounts desired. Excellent results have been obtained with amounts of from about 0.01% to 0.175% by weight. Under such circumstances there can be up to about 5% free water present. None of the compositions impart odor, taste or color to the stabilized fat, oil or food product in which they are used. Toxicity studies have proven that the compositions are non-toxic. The antioxidizing effects of the new compositions are illustrated by the following table:

*Milligrams per 100 grams of fat*

| Fat | Propyl Gallate | Citric Acid | Lecithin | Corn Oil | A. O. M. Hrs. |
|---|---|---|---|---|---|
| Lard | 0 | 0 | 0 | 0 | 2.5 |
| Do | 3.44 | 3.75 | 22.5 | 70.31 | 35. |
| Do | 3.44 | 3.44 | 22.5 | 70.62 | 33.5 |
| Do | 3.44 | 2.50 | 22.5 | 71.56 | 33.5 |
| Do | 3.44 | 2.75 | 17.5 | 75.31 | 37. |
| Do | 3.44 | 3.12 | 17.5 | 75.94 | 35.5 |
| Do | 3.44 | 2.50 | 15.0 | 79.06 | 35.5 |
| Do | 3.3 | 3.0 | 17.0 | 26.7 | 40. |

The antioxidant composition of lecithin citrate and an edible oil carrier may be combined with nordihydroguaiaretic acid, hereinafter referred to as "NDGA" instead of gallic acid ester. In preparing such a composition it is desirable to first dissolve the "NDGA" in lecithin and then add the corn oil and citric acid in order to prevent separation of the "NDGA" from the solution. As an example of preparing a solution in an edible oil of the fat soluble reaction product of lecithin and citric acid and "NDGA," 2 grams of "NDGA" were added to 34 grams of lecithin and the mixture was stirred at room temperature until the "NDGA" was thoroughly worked into the lecithin, following which the mixture was heated to 190° to 195° F. and stirred continuously for about 45 minutes until the "NDGA" was completely dissolved. 58 grams of corn oil was slowly added. During this period and for 30 minutes thereafter, the solution was stirred continuously and the temperature maintained at 190° to 195° F. 6 grams of citric acid was then added over a period of 15 minutes and the solution was stirred continuously during this addition and for 45 minutes thereafter until the citric acid was completely dissolved, the temperature of the solution being maintained at between 190° and 195° F. The resulting antioxidant solution was then rapidly cooled to room temperature. On standing for a long period of time the "NDGA" did not separate out.

The antioxidant composition of lecithin citrate and an edible oil may be combined with both "NDGA" and butylated hydroxyanisole, hereinafter referred to as "BHA." In preparing such a composition it is desirable to first dissolve the "NDGA" in lecithin and then add the other ingredients in order to prevent separation of the "NDGA" from the resulting antioxidant solution. As an example of preparing such a solution, 2 grams of "NDGA" were added to 22.67 grams of lecithin and the mixture was stirred at room temperature until the "NDGA" was thoroughly worked into the lecithin. This mixture was then heated to between 190° and 195° F. and stirred continuously for about 45 minutes until the "NDGA" was completely dissolved. 39.3 grams of corn oil was slowly added and the solution then stirred for about 30 minutes thereafter while maintaining the temperature at between 190° and 195° F. 3.73 grams of citric acid was then added over a period of 15 minutes and the solution was stirred continuously during this addition and for 45 minutes thereafter until the citric acid was completely dissolved, the temperature of the solution being maintained at between 190° and 195° F. 13.32 grams of "BHA" was added to 19.98 grams of corn oil and this mixture stirred until the "BHA" was completely dissolved in the corn oil. The two solutions were then mixed together and agitated with the temperature being maintained between room temperature and 128° F. until complete uniformity was achieved. On standing for a long period, neither the "NDGA" nor the "BHA" separated out.

The foregoing detailed description is given for clearness of understanding only and no unnecessary limitations should be understood therefrom, for some modifications will be obvious to those skilled in the art.

I claim:

1. An antioxidant composition comprising a solution in an edible oil of lecithin citrate.

2. An antioxidant composition comprising a solution, in an edible oil, of lecithin citrate, and an oil soluble antioxidant.

3. An antioxidant composition comprising a solution, in an edible oil, of lecithin citrate, and a gallic acid ester of the class consisting of methyl, ethyl, propyl, butyl, hexyl and lauryl gallates.

4. An antioxidant composition comprising a solution, in an edible oil, of lecithin citrate, and propyl gallate.

5. An antioxidant composition comprising a solution, in an edible oil, of lecithin citrate and nordihydroguaiaretic acid.

6. A fatty food material protected against oxidation by an antioxidant comprising lecithin citrate.

7. As a new compound, lecithin citrate.

8. The method of making lecithin citrate which comprises mixing lecithin with citric acid at a temperature maintained sufficiently high to cause reaction but below the decomposition point of lecithin, there being not more than about 2% of free water present during the reaction; agitating until substantially all of the citric acid reacts with the lecithin; and then rapidly cooling the resulting lecithin citrate.

9. The method as set forth in claim 8 in which the reaction temperature is maintained at about 180° to 185° F. until substantially all of the citric acid is dissolved.

10. The method of making an antioxidant solution which comprises adding lecithin citrate to an edible oil maintained at a temperature sufficiently high to cause lecithin citrate to dissolve in the edible oil but below the decomposition point of lecithin, there being not more than about 1% of free water present during the dissolving of lecithin citrate in the edible oil; agitating until substantially all of the lecithin citrate is dissolved; and then cooling the resulting antioxidant solution.

11. The method of making an antioxidant solution which comprises adding a gallic acid ester of the class consisting of ethyl, methyl, propyl, butyl, hexyl and lauryl gallates to a solution of lecithin citrate dissolved in an edible oil, the temperature of said solution being maintained at a temperature sufficiently high to cause said gallic acid ester to dissolve, but below the decomposition point of lecithin, there being not more than about 5% free water present during the dissolving of said gallic acid ester; agitating until substantially all of said gallic acid ester is dissolved; and then rapidly cooling the resulting antioxidant solution.

12. The method as set forth in claim 11 in which the temperature maintained during the dissolving of said gallic acid ester is about 180° to 185° F.

13. The method of making an antioxidant solution which comprises adding nordihydroguaiaretic acid to lecithin; heating the mixture to a temperature sufficiently high to cause dissolving of the nordihydroguaiaretic acid, but below the decomposition point of the lecithin; agitating until substantially all of the nordihydroguaiaretic acid is dissolved; adding an edible oil to the nordihydroguaiaretic acid-lecithin mixture maintained at a temperature sufficiently high to cause dissolving of the edible oil, but below the decomposition point of the lecithin; agitating until substantially all of the edible oil is dissolved; adding citric acid to the nordihydroguaiaretic acid-lecithin-edible oil solution maintained at a temperature sufficiently high to cause reaction of the citric acid with lecithin, but below the decomposition point of the lecithin, there being not more than about 2% free water present during the reaction; agitating until substantially all of the citric acid is reacted with the lecithin; and then rapidly cooling the resulting antioxidant solution to room temperature.

14. The method as set forth in claim 13 wherein the edible oil is dissolved and the citric acid is reacted with lecithin at a maintained temperature of from about 190° to 195° F.

References Cited in the file of this patent

UNITED STATES PATENTS

| Number | Name | Date |
|---|---|---|
| 2,198,208 | Musher | Apr. 23, 1940 |

OTHER REFERENCES

Riemenschneider et al., Oil and Soap, October 1944, pages 307–9.